United States Patent
Oliver et al.

(10) Patent No.: US 7,424,464 B2
(45) Date of Patent: Sep. 9, 2008

(54) MAXIMIZING MUTUAL INFORMATION BETWEEN OBSERVATIONS AND HIDDEN STATES TO MINIMIZE CLASSIFICATION ERRORS

(75) Inventors: Nuria M. Oliver, Kirkland, WA (US); Ashutosh Garg, Urbana, IL (US)

(73) Assignee: Microsoft Corporation, Redmond, WA (US)

(*) Notice: Subject to any disclaimer, the term of this patent is extended or adjusted under 35 U.S.C. 154(b) by 248 days.

(21) Appl. No.: 11/301,996

(22) Filed: Dec. 13, 2005

(65) Prior Publication Data

US 2006/0112043 A1 May 25, 2006

Related U.S. Application Data

(63) Continuation of application No. 10/180,770, filed on Jun. 26, 2002, now Pat. No. 7,007,001.

(51) Int. Cl.
*G06E 1/00* (2006.01)
*G06E 3/00* (2006.01)
*G06F 15/18* (2006.01)
*G06G 7/00* (2006.01)

(52) U.S. Cl. .................................................. 706/21
(58) Field of Classification Search ................ None
See application file for complete search history.

(56) References Cited

U.S. PATENT DOCUMENTS 6,581,048 B1   6/2003   Werbos 7,007,001 B2 * 2/2006 Oliver et al. ................ 706/21

OTHER PUBLICATIONS

Watermarking Video Clips with Workload Information for DVS Huang, Yicheng; Chakraborty, Samarjit; Wang, Ye; VLSI Design, 2008. VLSID 2208. 21st International Conference on Jan. 4-8, 2008 pp. 712-717 Digital Object Identifier 10.1109/VLSI.2008.103.*
Perceptual video quality evaluation using fuzzy inference system Yao, S.; Weisi Lin; Zhongkang Lu; EePing Ong; Xiaokang Yang; Ciruits and Systems, 2004. ISCAS '04. Proceedings of the 2004 International Symposium on vol. 3, May 23-26, 2004 pp. III-897-III-900 vol. 3 Digital Object Identifier 10.1109/ISCAS.2004.1328892.*
On reducing the inter frame rate: an embedded residual image model for mesh-based motion tracking Yankun Wei; Wael Badawy; Image Processing. 2002. Proceedings. 2002 International Conference on vol. 1, Sep. 22-25, 2002 pp. I-677-I-680 vol. 1 Digital Object Identifier 10.1109/ICIP.2002.1038115.*

(Continued)

*Primary Examiner*—Michael B Holmes
(74) *Attorney, Agent, or Firm*—Amin, Turocy & Calvin, LLP

(57) ABSTRACT

The present invention relates to a system and methodology to facilitate machine learning and predictive capabilities in a processing environment. In one aspect of the present invention, a Mutual Information Model is provided to facilitate predictive state determinations in accordance with signal or data analysis, and to mitigate classification error. The model parameters are computed by maximizing a convex combination of the mutual information between hidden states and the observations and the joint likelihood of states and observations in training data. Once the model parameters have been learned, new data can be accurately classified.

20 Claims, 10 Drawing Sheets

OTHER PUBLICATIONS

Principles and applications of content-aware video communication Shih-Fu Chang; Bocheck, P.; Ciruits and Systems, 2000. Proceedings. ISCAS 2000 Geneva. The 2000 IEEE International Symposium on vol. 4, May 28-31, 2000 pp. 33-36 vol. 4 Digital Object Identifier 10.1109/ISCAS.2000.85861.*

A new video object motion estimation technique, based on evolutionary programming Cotua, J.G.; Markhauser, C.P.; Devices, Ciruits and Systems, 2000. Proceedings of the 2000 Third IEEE International Caracas Conference on Mar. 15-17, 2000 pp. T106/1-T106/5 Digital Object Identifier 10.1109/ICCDCS.2000.869889.*

MPEG video quality prediction in a wireless system Robert, P.M.; Darwish, A.M.; Reed, J.H.; Vehicular Technology Conference, 1999 IEEE 49th vol. 2, May 16-20, 1999 pp. 1490-1495 vol. 2 Digital Object Identifier 10.1109/VETEC.1999.780595.*

Video coding mechanism to predict video traffic in ATM networks Coelho, R.; Tohme, S.; Global Telecommunications Conference, 1993, including a Communications Theory Mini-Conference. Technical Program Conference Record, IEEE in Houston. GLOBECOM '93., IEEE Nov. 29-Dec. 2, 1993 pp. 447-451 vol. Digital Object Identifier.*

Matthew Brand, et al., "Discovery and Segmentation of Activities in Video", IEEE Transactions on Pattern Analysis and Machine Intelligence, Aug. 2000, vol. 22, No. 8.

Matthew Brand, et al., "Coupled Hidden Markov Models for Complex Action Recognition", MIT Media Lab Perceptual Computing/Learning and Common Sense Technical Report 407, Nov. 10, 1996.

Ira Cohen, et al., "Emotion Recognition From Facial Expressions Using Multilevel HMM", Beckman Institute for Advanced Science and Technology; pp. 1-7, date unknown.

"Towards Perceptual Intelligence: Statistical Modeling of Human Individual and Interactive Behaviors", Submitted to the Program in Media Arts and Sciences on Apr. 28, 2000, pp. 1-297.

James M. Rehg, "Vision for a Smart Kiosk", Computer Vision and Pattern Recognition, Jun. 1997, pp. 690-696.

Liyanage C. Desilva, "Facial Emotion Recognition Using Multi-Model Information", International Conference on Information, Communications and Signal Processing ICICS '97, Sep. 1997, pp. 397-401.

Aphrodite Galata, et al., "Learning Variable Length Markov Models of Behaviour", School of Computing; The University of Leeds, pp. 1-33, date unknown.

"Audio-Visual Speaker Detection Using Dynamic Bayesian Networks", Submission No. 182, pp. 1-6, date unknown.

Ashutosh Garg, et al., "Understanding Probabilistic Classifiers", Department of Computer Science and the Beckman Institute, University of Illinois, pp. 1-12, date unknown.

Naftali Tishby, et al., "The Information Bottleneck Method", The Hebrew University, pp. 1-11, date unknown.

Andrew D. Wilson, et al., "Recognition and Interpretation of Parametric Gesture", Submitted to: International Conference on Computer Vision, 1998, pp. 1-9.

Lalit R. Nahl, et al., "Maximum Mutual Information Estimation of Hidden Markov Model Parameters for Speech Recognition", ICASSP 86, pp. 1-4, Tokyo, date unknown.

Yoshua Bengio, et al., "An Input Output HMM Architecture", date unknown.

Jeff A. Bilmes, "Dynamic Bayestian Multinets", Department of Electrical Enginnering, Univ. of Washington, date unknown.

Zoubin Ghahramani, et al., "Factorial Hidden Markov Models", Computational Cognitive Science Technical Report 9502, May 16, 1995, pp. 1-13.

Tony Jebara, "Action-Reaction Learning: Analysis and Synthesis of Human Behaviour", Massachusetts Institute of Technology, May 1998, pp. 1-100.

Michael I. Jordan, et al., "Hidden Markov Decision Trees", MIT Computational Cognitive Science Technical Report 9605, date unknown.

Nuria Oliver, et al., MIHMM: Mutual Information Hidden Markov Models, Proceedings of Int. Conf. on Machine Learning (ICML '02), Sidney, Australia, Jul. 2002, 8 pages.

Jeff A. Blimes, "Maximum Mutual Information Based Reduction Strategies for Cross-Correlation Based Joint Distributional Modeling", IEEE, International Conference on Acoustics, Speech, and Signal Processing, Seattle, Washington, 1998, 4 pages.

* cited by examiner

MAXIMIZING MUTUAL INFORMATION BETWEEN OBSERVATIONS AND HIDDEN STATES TO MINIMIZE CLASSIFICATION ERRORS

CROSS-REFERENCE TO RELATED APPLICATIONS

This application is a continuation of U.S. patent application Ser. No. 10/180,770, which was filed on Jun. 26, 2002 and entitled, "MAXIMIZING MUTUAL INFORMATION BETWEEN OBSERVATIONS AND HIDDEN STATES TO MINIMIZE CLASSIFICATION ERRORS." The entirety of the aforementioned application is hereby incorporated by reference.

TECHNICAL FIELD

The present invention relates generally to computer systems, and more particularly to a system and method to predict state information from real-time sampled data and/or stored data or sequences via a conditional entropy model obtained by maximizing the convex combination of the mutual information within the model and the likelihood of the data given the model, while mitigating classification errors therein.

BACKGROUND OF THE INVENTION

Numerous variations relating to a standard formulation of Hidden Markov Models (HMM) have been proposed in the past, such as an Entropic-HMM, Variable-length HMM, Coupled-HMM, Input/Output-HMM, Factorial HMM and Hidden Markov Decision Trees, to cite but a few examples. Respective approaches have attempted to solve some deficiencies of standard HMMs given a particular problem or set of problems at hand. Many of these approaches are directed at modeling data, and learning associated parameters employing Maximum Likelihood (ML) criteria. In most cases, differences in modeling techniques lie in the conditional independence assumptions made while modeling data, reflected primarily in their graphical structure.

One process for modeling data involves an Information Bottleneck method in an unsupervised, non-parametric data organization technique. For example, Given a joint distribution P (A, B), the method constructs, employing information theoretic principles, a new variable T that extracts partitions, or clusters, over values of A that are informative about B. In particular, consider two random variables X and Q with their joint distribution P(X, Q), wherein X is a variable to be compressed with respect to a 'relevant' variable Q. The auxiliary variable T introduces a soft partitioning of X, and a probabilistic mapping P(T|X), such that the mutual information I(T;X) is minimized (maximum compression) while the relevant information I(T;Q) is maximized. A related approach is an "infomax criterion", proposed in the neural network community, whereby a goal is to maximize mutual information between input and the output variables in a neural network.

Standard HMM algorithms generally perform a joint density estimation of the hidden state and observation random variables. However, in situations involving limited resources—for example when the associated modeling system has to process a limited amount of data in very high dimensional spaces; or if the goal is to classify or cluster with the learned model, a conditional approach may be superior to a joint density approach. It is noted, however, that these two methods (conditional vs. joint) could be viewed as operating at opposite ends of a processing/performance spectrum, and thus, are generally applied in an independent fashion to solve machine learning problems.

In yet another modeling method, a Maximum Mutual Information Estimation (MMIE) technique has been applied in the area of speech recognition. As is known, MMIE techniques can be employed for estimating the parameters of an HMM in the context of speech recognition, wherein a different HMM is typically learned for each possible class (e.g., one HMM trained for each word in a vocabulary). New waveforms are then classified by computing their likelihood based on each of the respective models. The model with the highest likelihood for a given waveform is then selected as identifying a possible candidate. Thus, MMIE attempts to maximize mutual information between a selection of an HMM (from a related grouping of HMMs) and an observation sequence to improve discrimination across different models. Unfortunately, the MMIE approach requires training of multiple models known a-priori,—which can be time consuming, computationally complex and is generally not applicable when the states are associated with the class variables.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate automated data analysis and machine learning in order to predict desired outcomes or states associated with various applications (e.g., speaker recognition, facial analysis, genome sequence predictions). At the core of the system, an information theoretic approach is developed and is applied to a predictive machine learning system. The system can be employed to address difficulties in connection to formalizing human-intuitive ideas about information, such as determining whether the information is meaningful or relevant for a particular task. These difficulties are addressed in part via an innovative approach for parameter estimation in a Hidden Markov Model (HMM) (or other graphical model) which yields to what is referred to as Mutual Information Hidden Markov Models (MIHMMs). The estimation framework could be used for parameter estimation in other graphical models.

The MI model of the present invention employs a hidden variable that is utilized to determine relevant information by extracting information from multiple observed variables or sources within the model to facilitate predicting desired information. For example, such predictions can include detecting the presence of a person that is speaking in a noisy, open-microphone environment, and/or facilitate emotion recognition from a facial display. In contrast to conventional systems, that may attempt to maximize mutual information between a selection of a model from a grouping of associated models and an observation sequence across different models, the MI model of the present invention maximizes a new objective function that trades-off the mutual information between observations and hidden states with the log-likelihood of the observations and the states—within the bounds of a single model, thus mitigating training requirements across multiple models, and mitigating classification errors when the hidden states of the model are employed as the classification output.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

A fundamental problem in formalizing intuitive ideas about information is to provide a quantitative notion of 'meaningful' or 'relevant' information. These issues were often missing in the original formulation of information theory, wherein much attention was focused on the problem of transmitting information rather than evaluating its value to a recipient. Information theory has therefore traditionally been viewed as a theory of communication. However, in recent years there has been growing interest in applying information theoretic principles to other areas.

The present invention employs an adaptive model that can be used in many different applications and data, such as to compress or summarize dynamic time data, as one example, and to process speech/video signals in another example. In one aspect of the present invention, a 'hidden' variable is defined that facilitates determinations of what is relevant. In the case of speech, for example, it may be a transcription of an audio signal—if solving a speech recognition problem, or a speaker's identity—if speaker identification is desired. Thus, an underlying structure to process such applications and others can consist of extracting information from one variable that is relevant for the prediction of another variable.

According to another aspect of the present invention, information theory can be employed in the framework of a Hidden Markov Model (HMMs) (or other type of graphical models), by generally enforcing that hidden state variables capture relevant information about associated observations. In a similar manner, the model can be adapted to explain or predict a generative process for data in an accurate manner. Therefore, an objective function can be provided that combines information theoretic and maximum likelihood (ML) criteria as will be described below.

Figure 1:
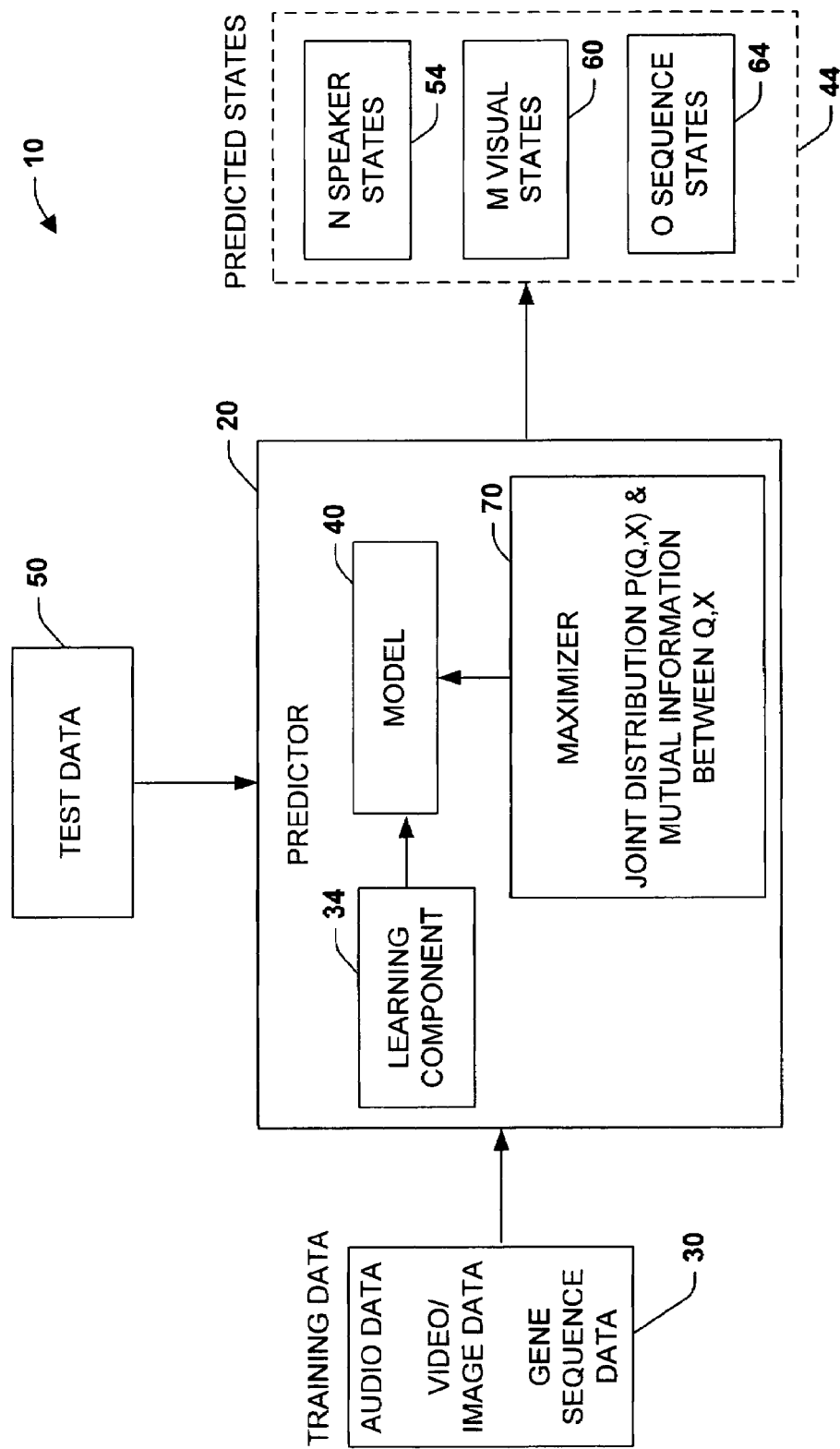
FIG. 1 is a schematic block diagram illustrating an automated machine learning architecture in accordance with an aspect of the present invention.

Referring initially to FIG. 1, an automated machine learning and prediction system 10 is illustrated in accordance with an aspect of the present invention. A prediction component 20 is provided that can be executed in accordance with a computer processing environment and/or a networked processing environment (e.g., aspects being described herein performed on multiple remote and/or local processing platforms via data packets communicated there between). The prediction component 20 receives input from a plurality of training data types 30 that can include audio data, video data, and/or any other kind of sequence data, such as gene sequences. A learning component 34 (e.g., various learning algorithms described below) is trained in accordance with the training data 30. Once the parameters have been learned, the model (which will have low entropy) 40 can be used to determine a plurality of predicted states 44. It is noted that the concept of learning and entropy is described in more detail below in relation to FIGS. 2, 3 and 4.

After the model 40 has been trained via the learning component 34, test data 50 is received by the prediction component 20 and processed by the model to determine the predicted states 44. The test data 50 can be signal or pattern data (e.g., real time, sampled audio/video, data/streams, or a gene or any other data sequence read from a file) that is processed in order to predict possible current/future patterns or states 44 via learned parameters derived from previously processed training data 30 in the learning component 34. A plurality of applications, which are described and illustrated in more detail below can then employ the predicted states 44 to achieve one or more possible automated outcomes. As an example, the predicted states 44 can include N speaker states 54, N being an integer, wherein the speaker states are employed in a speaker processing system (not shown) to determine a speaker's presence in a noisy environment. Other possible states can include M visual states 60, M being an integer, wherein the visual states are employed to detect such features as a person's facial expression given previously learned expressions. Still yet another predicted state 44 can include sequence states 64. For example, previous gene sequences can be learned from the training data 30 to predict possible future and/or unknown gene sequences that are derived from previous training sequences. It is to be appreciated that other possible states can be determined (e.g., handwriting analysis states given past training samples of electronic signatures, retina analysis, patterns of human behavior, and so forth).

In yet another aspect of the present invention, a maximizer 70 is provided (e.g., an equation, function, circuit) that maximizes a joint probability distribution function P(Q,X), Q corresponding to hidden states, X corresponding to observed states, wherein the maximizer attempts to force the Q variable to contain maximum mutual information about the X variable. The maximizer 70 is applied to an objective function which is also described in more detail below. It cooperates with the learning component 34 to determine the parameters of the model.

Figure 2:
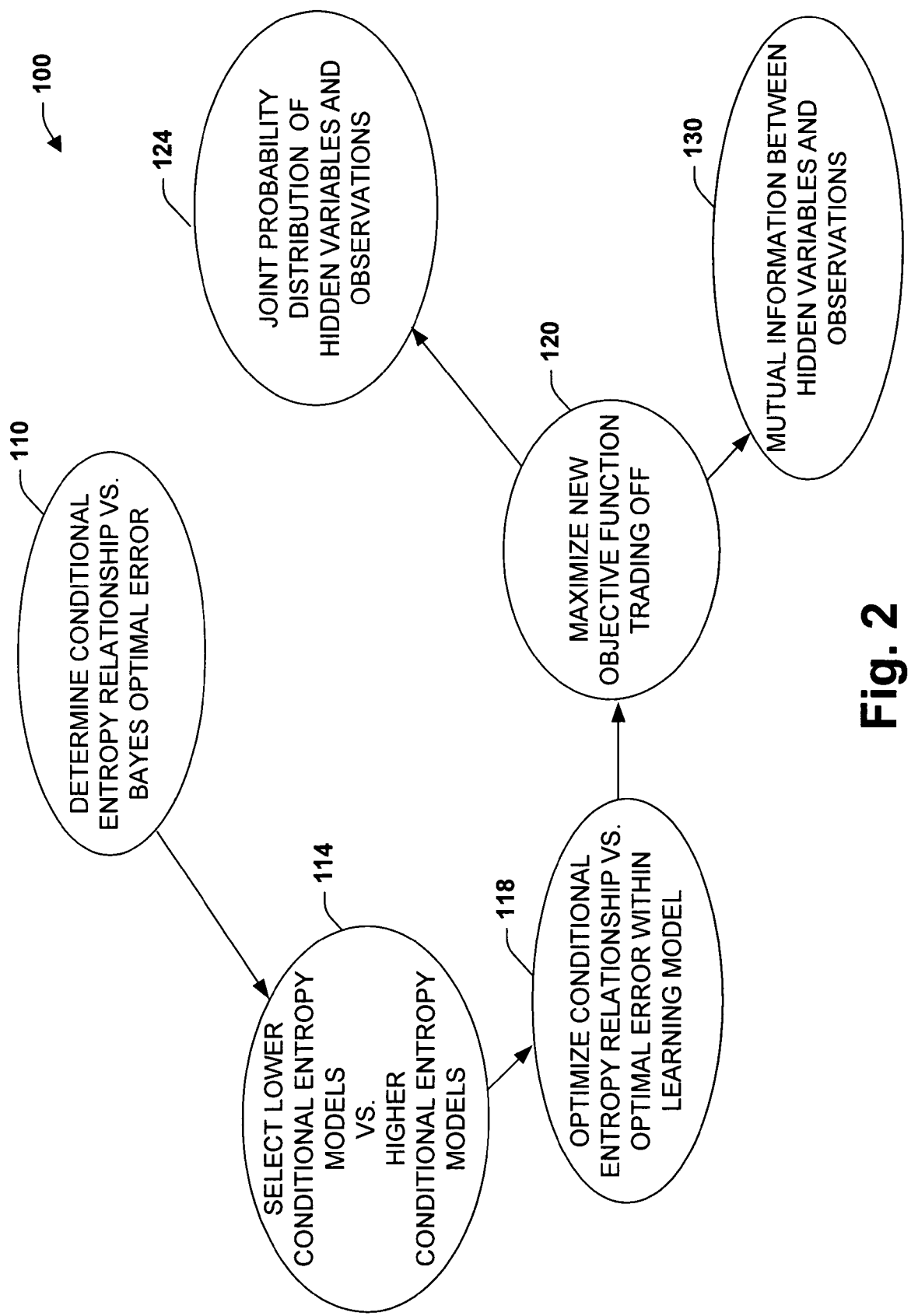
FIG. 2 is a flow diagram illustrating a modeling methodology in accordance with an aspect of the present invention.
Figure 3:
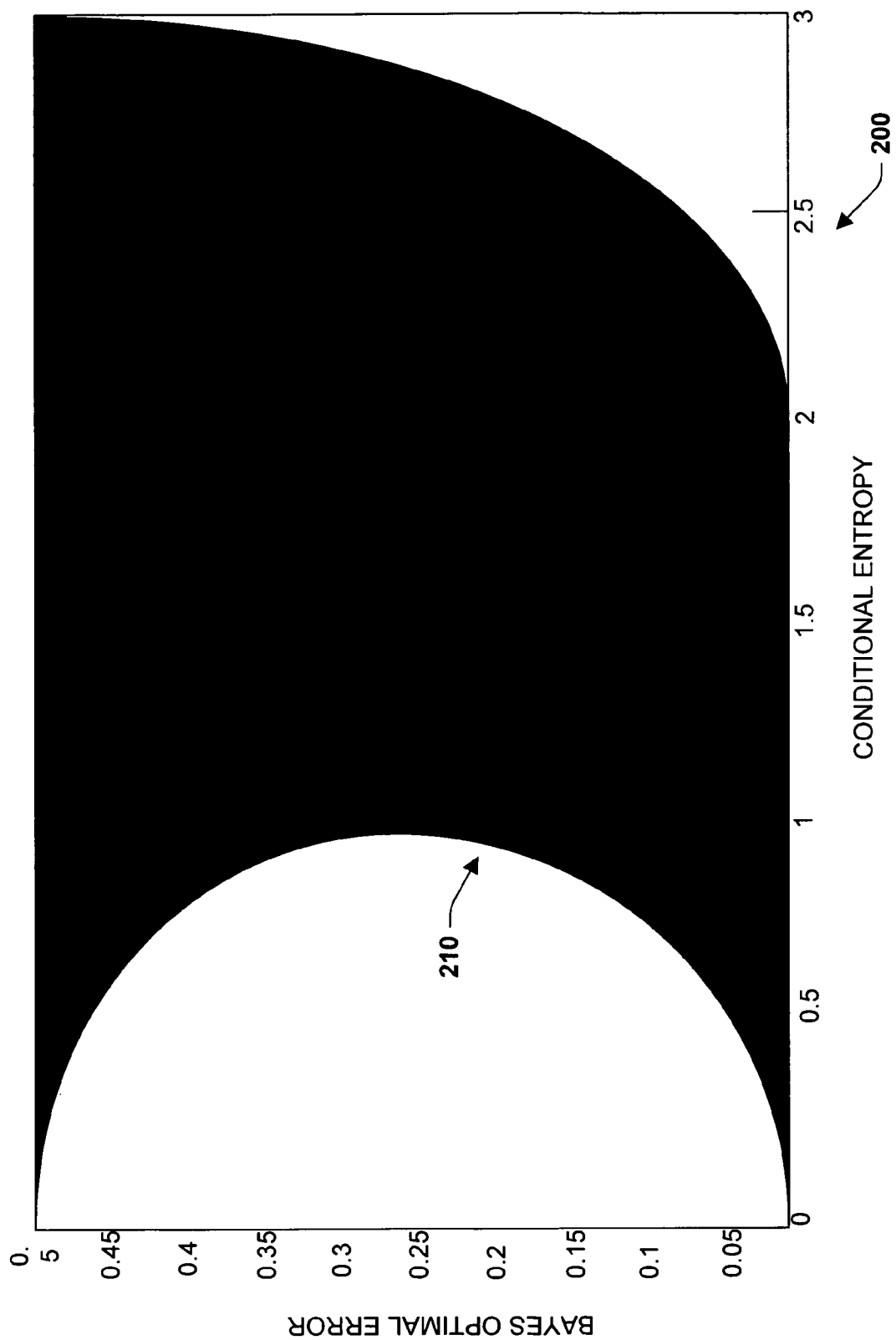
FIG. 3 is a diagram illustrating the conditional entropy versus the Bayes optimal classification error relationship in accordance with an aspect of the present invention.
Figure 4:
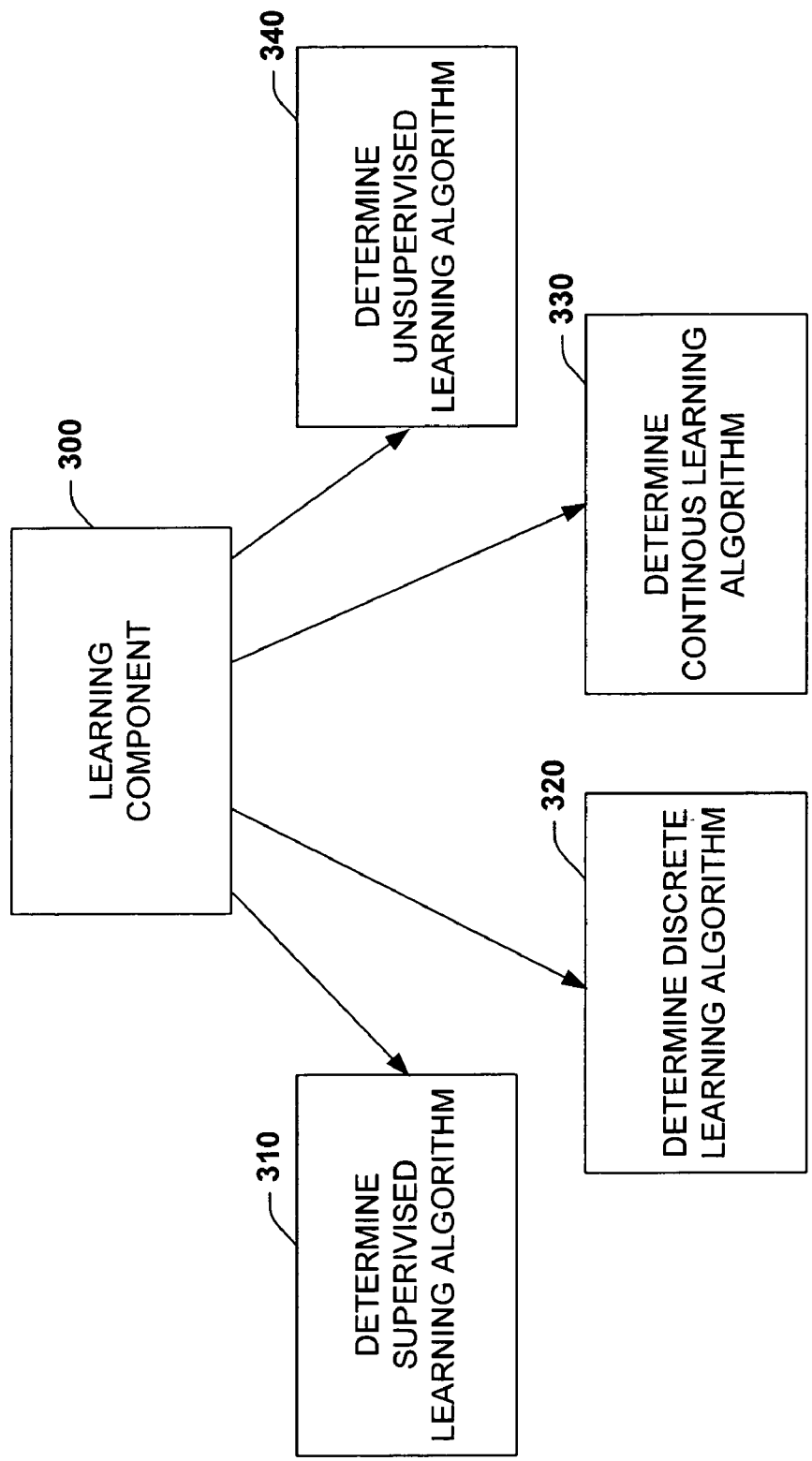
FIG. 4 is a flow diagram illustrating a learning methodology in accordance with an aspect of the present invention.

FIGS. 2 through 4 illustrate methodologies and diagrams that further illustrate concepts of entropy, learning, and maximization principles indicated above. While, for purposes of simplicity of explanation, the methodologies may be shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring now to FIG. 2, a process 100 illustrates possible model building techniques in accordance with the (low entropy) model described above. Proceeding to 110, a conditional entropy relationship is determined in view of possible potential classification error. In a 'generative approach' to machine learning, a goal may be to learn a probability distribution that defines a related process that generated the data. Such a process is effective at modeling the general form of the data and can yield useful insights into the nature of the original problem. There has been an increasing focus on connecting the performance of these generative models to an associated classification accuracy or error when utilized for classification tasks. Thus, it is noted that a relationship exists between a Bayes optimal error of a classification task that employs a probability distribution, and the associated entropy between random variables of interest. Thus, considering a family of probability distributions over two random variables (X,Q), denoted by P(X,Q), a related classification task is to predict Q after observing X. A relationship between a conditional entropy H(X|Q) and the Bayes optimal error, $\in$ is given by:

$$\frac{1}{2} H_b(2_\in) \leq H_b(\in) + \log \frac{M}{2}$$

wherein $H_b(p) = -(1-p)\log(1-p) - p \log p$ and M is the dimensionality of the variable X (data).

Referring briefly to FIG. 3, a diagram 200 illustrates this relationship between the Bayes optimal error and the conditional entropy. In general, the realizable (and at a similar time observable) distributions are those within a black region 210. One can observe from the diagram 200 that, if data is generated according to a distribution that has high conditional entropy, the Bayes optimal error of a respective classifier for this data will generally be high. Though the illustrated relationship is between a true model and the Bayes optimal error, it could also be applied to a model that has been estimated from data, {assuming a consistent estimator has been used, such as Maximum Likelihood (ML), and the model structure is the true one. As a result, when the learned distribution has high conditional entropy, it may not necessarily perform well on classification.

Referring back to FIG. 2, if a final goal is classification, the diagram 200 suggests that low entropy models should be selected over high entropy models as illustrated at 114 of FIG. 2. This result 114 can be related to Fano's inequality, which is known, and determines a lower bound to the probability of error when estimating a discrete random variable Q from another variable X. It can be expressed as:

$$P(q \neq \hat{q}) \geq \frac{H(Q|X) - 1}{\log N_c} = \frac{H(Q) - I(Q, X) - 1}{\log N_c}$$

wherein $\hat{q}$ is the estimate of Q after observing a sample of the data X and $N_c$ is the number of classes represented by the random variable Q. Thus the lower bound on error probability is minimized when the mutual information between Q and X, I(Q,X) is maximized.

Equation 2, described below, expresses an objective function that favors high mutual information models (and therefore low conditional entropy models) to low mutual information models when the goal is classification.

A Hidden Markov Model (HMM) which can be employed as the model mentioned at 118 of FIG. 2, is a probability distribution over a set of random variables, some of which are referred to as the hidden states (as they are normally not observed and they are discrete) and others are referred to as the observations (continuous or discrete). As noted above, other model types may also be adapted with the present invention (e.g., Bayesian networks, decision-trees, dynamic graphical models, and so forth). Traditionally, the parameters of HMMs are estimated by maximizing the joint likelihood of the hidden states Q and the observations X, P(X,Q). Conventional Maximum Likelihood (ML) techniques may be optimal in the case of very large datasets (so that the estimate of the parameters is correct) if the true distribution of the data was in fact an HMM. However, generally none of the previous conditions are normally true in practice. The HMM assumption may be in many occasions unrealistic and the available data for training is normally limited, leading to problems associated with the ML criterion (such as over-fitting). Moreover, ML estimated models are often utilized for clustering or classification. In these cases, the evaluation function is different to the objective function, which suggests the need of an objective function that suitably models the problem at hand. The objective function defined in Equation 2 below, is designed to mitigate some of the problems associated with ML estimation.

The objective function in Equation 2 was partially inspired by the relationship between the conditional entropy of the data and the Bayes optimal error, as previously described. It is optimized as illustrated at 118 of FIG. 2. In the case of HMMs, the X variable corresponds to the observations and the Q variable to the hidden states. Thus, P(Q,X) is selected such that the likelihood of the observed data is maximized at 124 of FIG. 2 while forcing the Q variable to contain maximum information about the X variable depicted at 130 of FIG. 2 (i.e., to maximize associated mutual information or minimize the conditional entropy). In consequence, it is effective to jointly maximize a trade-off between the joint likelihood and the mutual information between the hidden variables and the observations. This leads to the following objective function expressed as:

$$F = (1-\alpha)I(Q,X) + \alpha \log P(X_{obs}, Q_{obs}) \qquad \text{Equation 2:}$$

wherein $\alpha \in [0,1]$, provides a manner of determining an appropriate weighting between the Maximum Likelihood (ML) (when $\alpha=1$) and Maximum Mutual Information (MMI) ($\alpha=0$) criteria, and I (Q,X) refers to the mutual information between the states and the observations. However, the proposed state sequence in Equation 2 may not always be observed. In such a scenario, the objective function reduces to:

$$F = (1-\alpha)I(Q,X) + \alpha \log P(X_{obs}) \qquad \text{Equation 3:}$$

It is noted that to make more clear the distinction between "observed" (supervised) and "unobserved" (unsupervised) variables, the subscript $(.)_{obs}$ is employed to denote that the variables have been observed, (i.e., $X_{obs}$ for the observations and $Q_{obs}$ for the states).

The mutual information I(Q,X) is the reduction in the uncertainty of Q due to the knowledge of X. The mutual information is also related to a KL-distance or relative entropy between two distributions P(X) and P(Q). In particular, $I(Q,X)=KL(P(Q,X)\|P(X)P(Q))$, (i.e., the mutual information between X and Q is the KL-distance between the joint distribution and the factored distribution. It is therefore a measure of how conditionally dependent the two random variables are. The objective function proposed in Equation 2 penalizes factored distributions, favoring distributions where Q and X are mutually dependent. This is in accordance with the graphical structure of an HMM where the observations are conditionally dependent on the states, (i.e., $P(X,Q)=P(Q)P(X|Q)$).

Mutual information is also related to conditional likelihood. Learning the parameters of a graphical model is generally considered equivalent to learning the conditional dependencies between the variables (edges in the graphical model). The following theorem by Bilmes et al. (Bilmes, 2000), describes the relationship between conditional likelihood and mutual information in graphical models:

Given three random variables $X$, $Q^a$ and $Q^b$, where $I(Q^a,X)>I(Q^b,X)$, there is an $n_0$ such that if $n>n_0$, then $P(X^n|Q^a)>P(X^n|Q^b)$, i.e. the conditional likelihood of $X$ given $Q^a$ is higher than that of $X$ given $Q^b$          Theorem 1:

The above theorem also holds true for conditional mutual information, such as $I(X, Z|Q)$, or for a particular value of q, $I(X, Z|Q=q)$. Therefore, given a graphical model in general (and an HMM in particular) in which the parameters have been learned by maximizing the joint likelihood $P(X,Q)$, if edges were added according to mutual information, the resulting dynamic graphical model would yield higher conditional likelihood score than before the modification. Standard algorithms for parameter estimation in HMMs maximize the joint likelihood of the hidden states and the observations, $P(X,Q)$. However, it also may be desirable to determine that the states Q are suitable predictors of the observations X. According to Theorem 1, maximizing the mutual information between states and observations increases the conditional likelihood of the observations given the states $P(X|Q)$. This justifies, to some extent, why the objective function defined in Equation 2 combines desirable properties of maximizing the conditional and joint likelihood of the states and the observations.

Furthermore there is a relationship between the objective function in Equation 2 and entropic priors. The exponential of the objective function F, $e^F$, is given by:

$$e^F = P(X,Q)^\alpha e^{(1-\alpha)I(X,Q)} \propto P(X,Q)e^{wI(X,Q)} = P(X,Q)e^{w(H(X)-H(X|Q))}$$

wherein $e^{wI(X,Q)}$ can be considered an entropic prior (modulo a normalization constant) over the space of distributions modeled by an HMM (for example), preferring the distributions with high mutual information over distributions with low mutual information. The parameter w controls the weight of the prior. Therefore, the objective function defined in Equation 2 can be interpreted from a Bayesian perspective as a posterior distribution, with an entropic prior. Entropic priors for the parameters of a model have been previously proposed. However, in the case of the present invention, the prior is over the distributions and not over the parameters. Because H(X) does not depend on the parameters, the objective function becomes:

$$e^F \propto P(X,Q)e^{-wH(X|Q)}$$

wherein $e^{-wH(X|Q)}$ can be observed from the perspective of maximum-entropy estimation: if it is assumed that the expected entropy of this distribution is finite, i.e., $E(H(X|Q))=h$, wherein h is some finite value, the classic maximum-entropy method facilitates deriving a mathematical form of the solution distribution from knowledge about its expectations via Euler-Lagrange equations. In general, the solution for the prior is $P_e(X|Q)=e^{-\lambda H(X|Q)}$. This prior has two properties that derive from the definition of entropy: (1) $P_e(X|Q)$ is a bias for compact distributions having less ambiguity; (2) $P_e(X|Q)$ is invariant to re-parameterization of the model because the entropy is defined in terms of the model's joint and/or factored distributions.

Referring now to FIG. 4, a learning component 300 is illustrated that can be employed with various learning algorithms 310 through 340 in accordance with an aspect of the present invention. The learning algorithms 310-340 can be employed with discrete and continuous, supervised and unsupervised Mutual Information HMMs (MIHMMs hereafter). For the sake of clarity, a supervised case for learning is illustrated at 310, wherein 'hidden' states are actually observed in the training data.

Considering a Hidden Markov Model with Q as the states and X as the observations. Let F denote a function to maximize such as:

$$F = (1-\alpha)I(Q,X) + \alpha \log P(X_{obs}, Q_{obs}).$$

The mutual information term $I(Q,X)$ can be expressed as $I(Q,X)=H(X)-H(X|Q)$, wherein $H(\cdot)$ refers to the entropy. Since $H(X)$ is independent of the choice of a model and is characteristic of a generative process of the data, the objective function reduces to $$F = -(1-\alpha)H(X|Q) + \alpha \log P(X_{obs}, Q_{obs}) = (1-\alpha)F_1 + \alpha F_2$$

In the following, a standard HMM notation for a transition $a_{ij}$ and observation $b_{ij}$ probabilities is expressed as:

$$a_{ij}=P(q_{t+1}=j|q_t=i);\ b_{ij}=P(x_t=j|q_t=i)$$

Expanding the terms $F_1$ and $F_2$ separately to obtain:

$$F_1 = -H(X|Q)$$
$$= \sum_X \sum_Q P(X,Q) \log \prod_{t=1}^T P(x_t|q_t)$$
$$= \sum_{t=1}^T \sum_{j=1}^M \sum_{i=1}^N P(x_t=j|q_t=i)P(q_t=i)\log P(x_t=j|q_t=i)$$
$$= \sum_{t=1}^T \sum_{j=1}^M \sum_{i=1}^N P(q_t=i)b_{ij}\log b_{ij}$$

$$F_2 = \log \pi_{q_1^*} + \sum_{t=2}^T \log a_{q_{t-1}^*, q_t^*} + \sum_{t=1}^T \log b_{q_t^*, x_t^*}$$

Combining $F_1$ and $F_2$ and adding suitable Lagrange multipliers to facilitate that the $a_{ij}$ and $b_{ij}$ coefficients sum to about 1, to obtain:

$$F_L = (1-\alpha)\sum_{t=1}^T \sum_{j=1}^M \sum_{i=1}^N P(q_t=i)b_{ij}\log b_{ij} + \alpha \log \pi_{q_1^*} +$$
$$\alpha \sum_{t=2}^T \log a_{q_{t-1}^*, q_t^*} + \alpha \sum_{t=1}^T \log b_{q_t^*, x_t^*} +$$
$$\beta_i\left(\sum_j a_{ij} - 1\right) + \gamma_i\left(\sum_j b_{ij} - 1\right)$$

Equation 4 wherein $\pi_{q_1}{}^0$ is the initial probability of the states.

Note that in the case of continuous observation HMMs, the model can no longer employ the concept of entropy as previously defined, but its counterpart differential entropy is employed. Because of this distinction, an analysis for discrete and continuous observation HMMs is provided separately at 320 and 330 of FIG. 4.

Proceeding to 320 of FIG. 4, a discrete learning algorithm is determined. To obtain the parameters that maximize the $F_L$ function from Equation 4, the derivative of the function with respect to each of the parameters is determined and equated to zero. Solving for $b_{ij}$ to obtain:

$$\frac{\partial F_L}{\partial b_{ij}} = (1-\alpha)(1+\log b_{ij})\left(\sum_{t=1}^{T} P(q_t = i) + \frac{N_{ij}^b \alpha}{b_{ij}} + \gamma_i\right) \quad \text{Equation 5}$$

$$= 0$$

wherein $N_{ij}^b$ is a number of times observing state j when the hidden state is i. Equation 5 can be expressed as:

$$\log b_{ij} + \frac{W_{ij}}{b_{ij}} + g_i + 1 = 0 \quad \text{Equation 6}$$

wherein $$W_{ij} = \frac{N_{ij}^b \alpha}{(1-\alpha)\left(\sum_{t=1}^{T} P(q_t = i)\right)}$$

$$g_i = \frac{\gamma_i}{(1-\alpha)\left(\sum_{t=1}^{T} P(q_t = i)\right)}$$

A solution of Equation 6 is given by:

$$b_{ij} = -\frac{W_{ij}}{\text{LambertW}(-W_{ij}e^{1+g_i})}$$

wherein LambertW(x)=y is a solution of the equation $ye^y=x$.

Next to solve for $a_{ij}$, consider a derivative of $F_l$ with respect to $a_{lm}$.

$$\frac{\partial F_l}{\partial a_{lm}} = \sum_{t=1}^{T} \sum_{j=1}^{M} \sum_{i=1}^{N} b_{ij} \log b_{ij} \frac{\partial P(q_t = i)}{\partial a_{lm}}$$

To solve the above equation, compute $$\frac{\partial P(q_t = i)}{\partial a_{lm}}.$$

This can be computed utilizing the following iteration:

$$\frac{\partial P(q_t = i)}{\partial a_{lm}} = \begin{cases} \sum_j \frac{\partial P(q_{t-1} = j)}{\partial a_{lm}} a_{ji} & \text{if } m \neq i \\ \sum_j \frac{\partial P(q_{t-1} = j)}{\partial a_{lm}} a_{ji} + P(q_{t-1} = l) & \text{if } m = i \end{cases} \quad \text{Equation 7}$$

with initial conditions:

$$\frac{\partial P(q_2 = i)}{\partial a_{ln}} = \begin{cases} 0 & \text{if } m \neq i \\ \pi_l & \text{if } m = i \end{cases}$$

Taking the derivative of $F_L$, with respect to $a_{lm}$, to obtain, $$\frac{\partial F}{\partial a_{lm}} = (1-\alpha)\sum_{t=1}^{T}\sum_{i=1}^{N}\sum_{k=1}^{M} b_{ik} \log b_{ik} \frac{\partial P(x_t = i)}{\partial a_{lm}} + \alpha \frac{N_{lm}}{a_{lm}} + \beta_l$$

wherein $N_{lm}$ is a count of the number of occurrences of $q_{t-1}=l$, $q_t=m$ in the data set. The update equation for $a_{lm}$ is obtained by equating this quantity to zero and solving for $a_{lm}$ expressed as:

$$a_{lm} = \frac{\alpha N_{lm}}{(1-\alpha)\sum_{t=1}^{T}\sum_{i=1}^{N}\sum_{k=1}^{M} b_{ik}\log b_{ik} \frac{\partial P(x_t = i)}{\partial a_{lm}} + \beta_l} \quad \text{Equation 8}$$

wherein $\beta_l$ is selected such that $\sum_m a_{lm} = 1, \forall l$.

Proceeding to 330 of FIG. 4, next a continuous learning determination is described. For the purposes of clarity, the continuous case 330 is described when P(x|q) is a single Gaussian, however it could be extended to other distributions, and in particular other members of the exponential family. Under this assumption, the HMM may be characterized by the following parameters:

$$P(q_t = j \mid q_{t-1} = i) = a_{ij}$$

$$P(x_t \mid q_t = i) = \frac{1}{\sqrt{(2\pi)^d |\Sigma_i|}} \exp\left(-\frac{1}{2}(x_t - \mu_i)^T \sum_i^{-1} (x_t - \mu_i)\right)$$

wherein $$\sum_i$$

is the covariance matrix when the hidden state is i, d is the dimensionality of the data, and $|\sum_i|$ is the determinant of the covariance matrix. Next, for an objective function given in Equation 2 above, $F_1$ and $F_2$ can be expressed as:

$$F_1 = -H(X|Q)$$

$$= \sum_{t=1}^{T}\sum_{i=1}^{N} \int P(q_t=i)\log P(x_t|q_t=i)dP(x_t|q_t=i)$$

$$= \sum_{t=1}^{T}\sum_{i=1}^{N} P(q_t=i)\int \left(-\frac{1}{2}\log\left((2\pi)^d|\sum_i|\right) - \frac{1}{2}(x_t-\mu_i)^T\sum_i^{-1}(x_t-\mu_i)\right)dP(x_t|q_t=i)y$$

$$= \sum_{t=1}^{T}\sum_{i=1}^{N} P(q_t=i)\left(-\frac{1}{2}\log\left((2\pi)^d|\sum_i|\right) - \frac{1}{2}\right)$$

$$F_2 = \log P(Q_{obs}, X_{obs})$$

$$= \sum_{t=1}^{T}\log P(x_t|q_t) + \log \pi_{q_1^*} + \sum_{t=2}^{T}\log a_{q_{t-1}^*, q_t^*}$$

Following similar processes as for the discrete case 320, the Lagrange $F_L$ is formed by determining its derivative with respect to the unknown parameters which yields the corresponding update equations. The means of the Gaussians are determined as:

$$\mu_i = \frac{\sum_{t=1, q_t=i}^{T} x_t}{N_i}$$

wherein $N_i$ is a number of times $q_t=i$ appears in the observed data. Note that this is a standard update equation for the mean of a Gaussian, and it is similar as for ML estimation in HMMs. Generally, this result is achieved because the conditional entropy is independent of the mean.

Next, an update equation for $a_{lm}$ is similar as in Equation 8 above except for replacing $$\sum_k b_{ik}\log b_{ik} \text{ by } -\frac{1}{2}\log\left((2\pi)^d|\sum_i|\right) - \frac{1}{2}$$

Finally, the update equation for $$\sum_i$$

is expressed as:

$$\sum_i = \frac{\sum_{t=1,q_t=i}^{T}(x_t-\mu_i)(x_t-\mu_i)^T}{N_i + \frac{(1-\alpha)}{\alpha}\sum_{t=1}^{T}P(q_t=i)} \quad \text{Equation 9}$$

It is interesting to note that Equation 9 is similar to the one obtained when using ML estimation, except for the term in the denominator $$\frac{(1-\alpha)}{\alpha}\sum_{t=1}^{T}P(q_t=i),$$

which can be thought of as a regularization term. Because of this positive term, the covariance $$\sum_i$$

is smaller than what it would have been otherwise. This corresponds to lower conditional entropy, as desired.

Proceeding to 340 of FIG. 4, an unsupervised learning algorithm is determined. The above analysis can be extended to the unsupervised case, (i.e., when $X_{obs}$ is given and $Q_{obs}$ is not available). In this case, the objective function given in Equation 3 can be employed. The update equations for the parameters are similar to the equations obtained in the supervised case. The difference is that $N_{tj}$ in Equation 5 is replaced by $$\sum_{t=1, x_t=j}^{T} P(q_t=i|X_{obs}), N_{lm}$$

is replaced in Equation 8 by $$\sum_{t=2}^{T} P(q_{t-1}=l, q_t=m|X_{obs}),$$

and $N_i$ is replaced in Equation 9 by $$\sum_{t=1}^{T} P(q_t=i|X_{obs}).$$

These quantities can be computed utilizing a Baum-Welch algorithm, for example, via the standard HMM forward and backward variables.

The following description provides further mathematical analysis in accordance with the present invention.

Convexity

From the asymptotic equation property, it is known that, in the limit (i.e., as the number of samples approaches infinity), the likelihood of the data tends to the negative of the entropy, $P(X) \approx -H(X)$. Therefore and in the limit, the negative of the objective function for the supervised case 310 can be expressed as:

$$-F = (1-\alpha)H(X|Q) + \alpha H(X,Q) = H(X|Q) + \alpha H(Q) \quad \text{Equation 10:}$$

It is noted that $H(X|Q)$ is a concave function of $P(X|Q)$, and $H(X|Q)$ is a linear function of $P(Q)$. Consequently, in the limit, the objective function from Equation 10 is convex (its negative is concave) with respect to the distributions of interest.

In the unsupervised case at 340 and in the limit again, the objective function can be expressed as:

$$F = -(1-\alpha)H(X|Q) - \alpha H(X)$$
$$= -H(X) + (1-\alpha)(H(X) - H(X|Q))$$
$$= -H(X) + (1-\alpha)I(Q, X)$$
$$\approx P(X) + (1-\alpha)I(Q, X)$$

The unsupervised case 340 thus, reduces to the original case with $\alpha$ replaced by $(1-\alpha)$. Maximizing F is, in the limit, is similar to maximizing the likelihood of the data and the mutual information between the hidden and the observed states, as expected. The above analysis illustrates that in the asymptotic case, the objective function is convex and as such, a solution exists. However, in the case of a finite amount of data, local maxima may be a problem (as has been observed in the case of standard ML for HMM). It is noted that local minima problems have not been observed from experimental data.

Convergence

Figure 5:
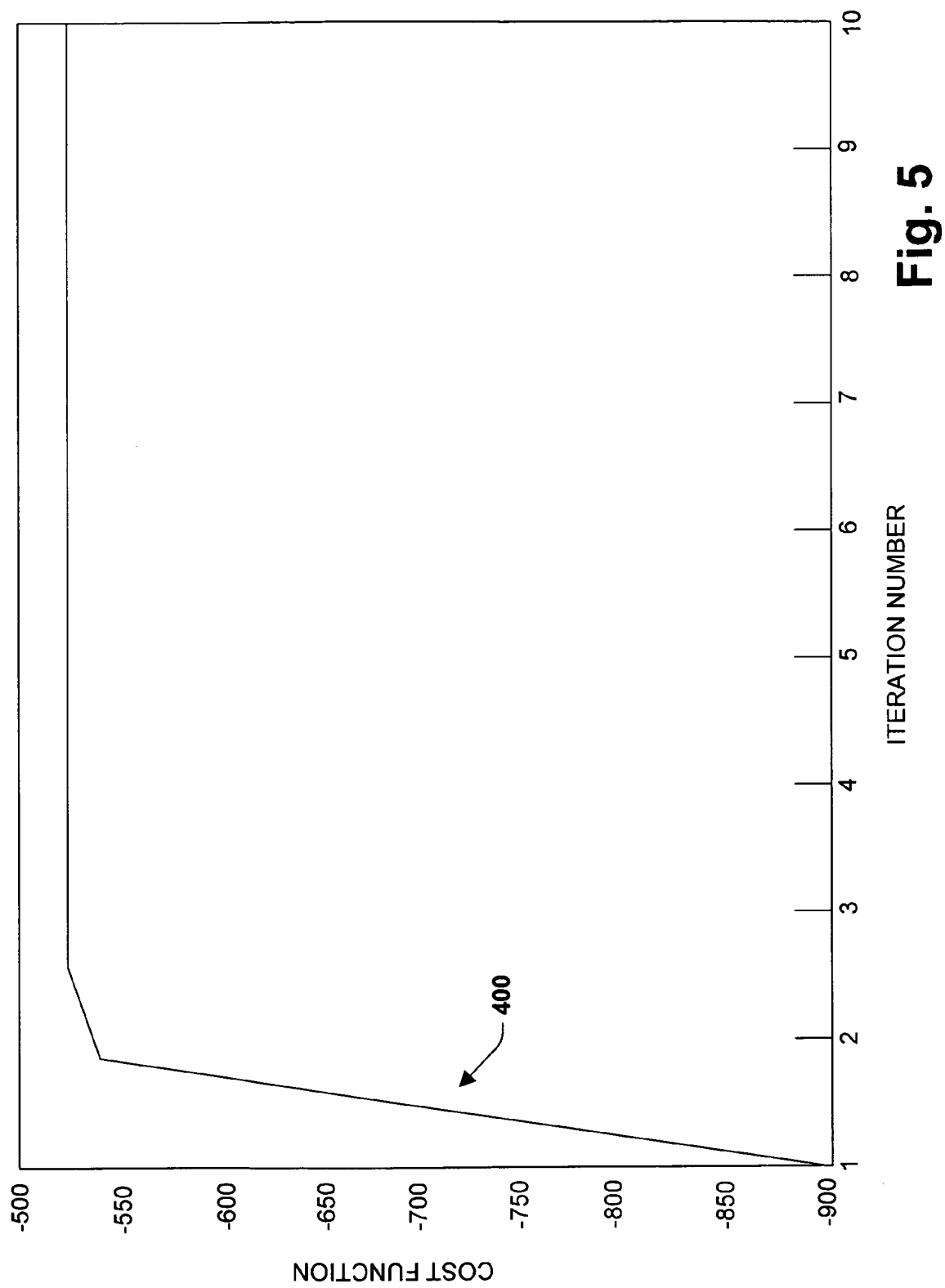
FIGS. 5 and 6 illustrate one or more model performance aspects in accordance with an aspect of the present invention.

The convergence of the MIHMM learning algorithm will now be described in the supervised and unsupervised cases 310 and 340. In the supervised case 310, the HMM parameters are directly learned—generally without iteration. However, an iterative solution is provided for estimating the parameters ($b_{ij}$ and $\alpha_{ij}$) in MIHMMs. These parameters are generally inter-dependent (i.e., in order to compute $b_{ij}$, compute $P(q_t=i)$, which utilizes knowledge of $\alpha_{ij}$). Therefore an iterative solution is employed. The convergence of the iterative algorithm is typically rapid, as illustrated in a graph 400 of FIG. 5.

Figure 6:
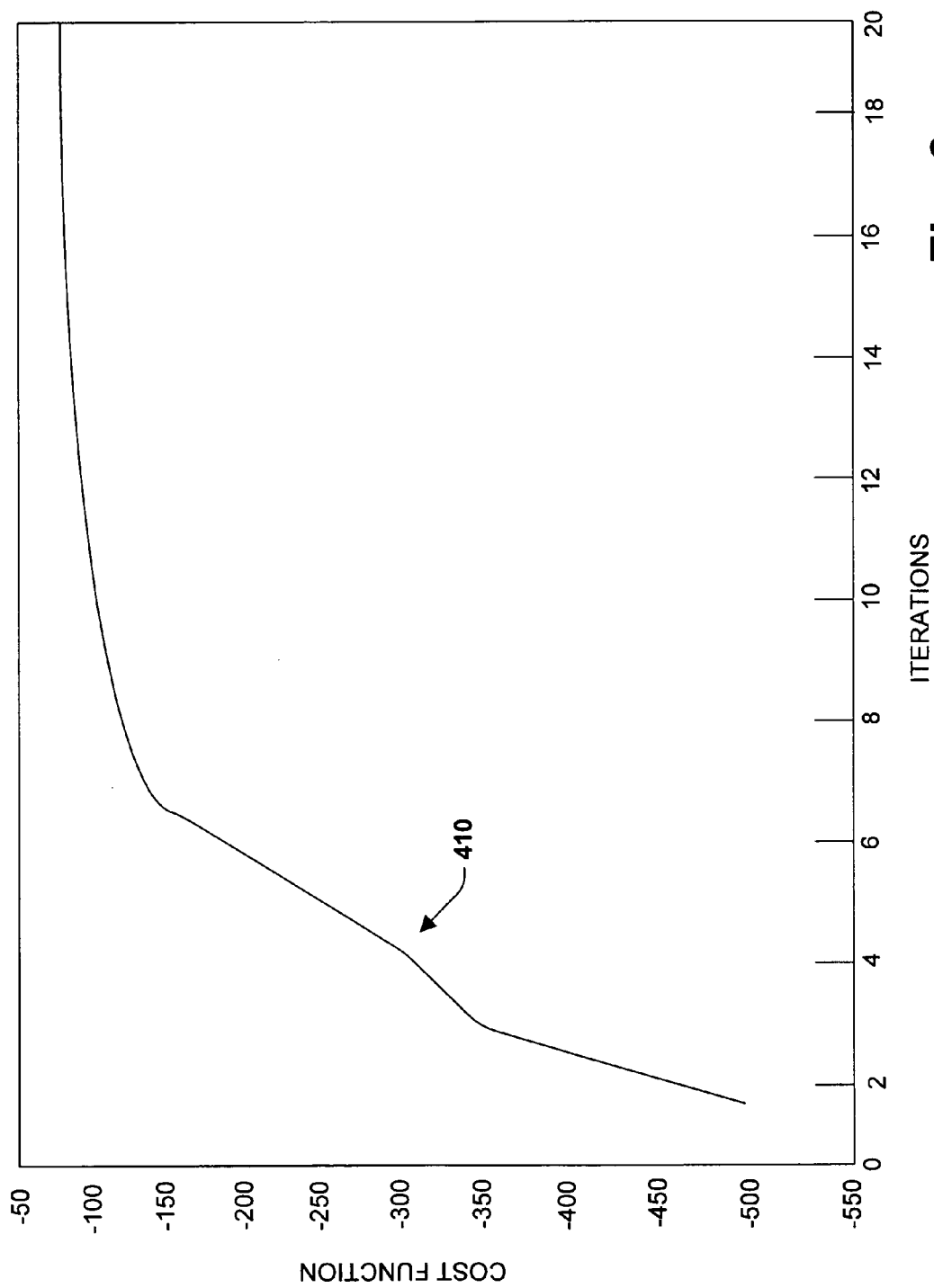

The graph 400 depicts the objective function with respect to the iterations for a particular case of the speaker detection problem described below. FIG. 6 illustrates a graph 410 for synthetically generated data in an unsupervised situation. From the graphs 400 and 410, it can be observed that the algorithm typically converges after a few (e.g., 5-6) iterations.

Computational Complexity

The MIHMM algorithms 310 to 340 are typically, computationally more expensive that the standard HMM algorithms for estimating the parameters of the model. The main additional complexity is due to the computation of the derivative of the probability of a state with respect to the transition probabilities, i.e., $$\frac{\partial P(q_t = i)}{\partial a_{lm}}$$

in Equation 7. For example, consider a discrete HMM with N states and M observation values—or dimensions in the continuous case—and sequences of length T. The complexity of Equation 7 in MIHMMs is $O(TN^4)$. Besides this term, the computation of $a_{ij}$ adds $TN^2$ computations. The computation of $b_{ij}$, i.e. the observation probabilities, required solving for the Lambert function, which is performed iteratively. However, this normally entails a small number of iterations that can be ignored in this analysis. Consequently, the computational complexity of MIHMMs for the discrete supervised case is $O(TN^4+TNM)$. In contrast, ML for HMMs using the Baum-Welch algorithm, is $O(TN^2+TNM)$. In the unsupervised case, the counts are replaced by probabilities, which can be estimated via the forward-backward algorithm and in which computational complexity is of the order of $O(TN^2)$. Hence the overall order remains the same. It is noted that there may be an additional incurred penalty because of the cross-validation computations to estimate the optimal value of $\alpha$. However, if the number of cross-validation rounds and the number of $\alpha$'s attempted is fixed, the order remains the same even though the actual numbers might increase.

A similar analysis for the continuous case reveals that, when compared to standard HMMs, the additional cost is $O(TN^4)$. Once the parameters have been learned, inference is carried out in a similar manner and with the same complexity as with HMMs, because the graphical structure of MIHMMs is identical to that of HMMs.

Figure 7:
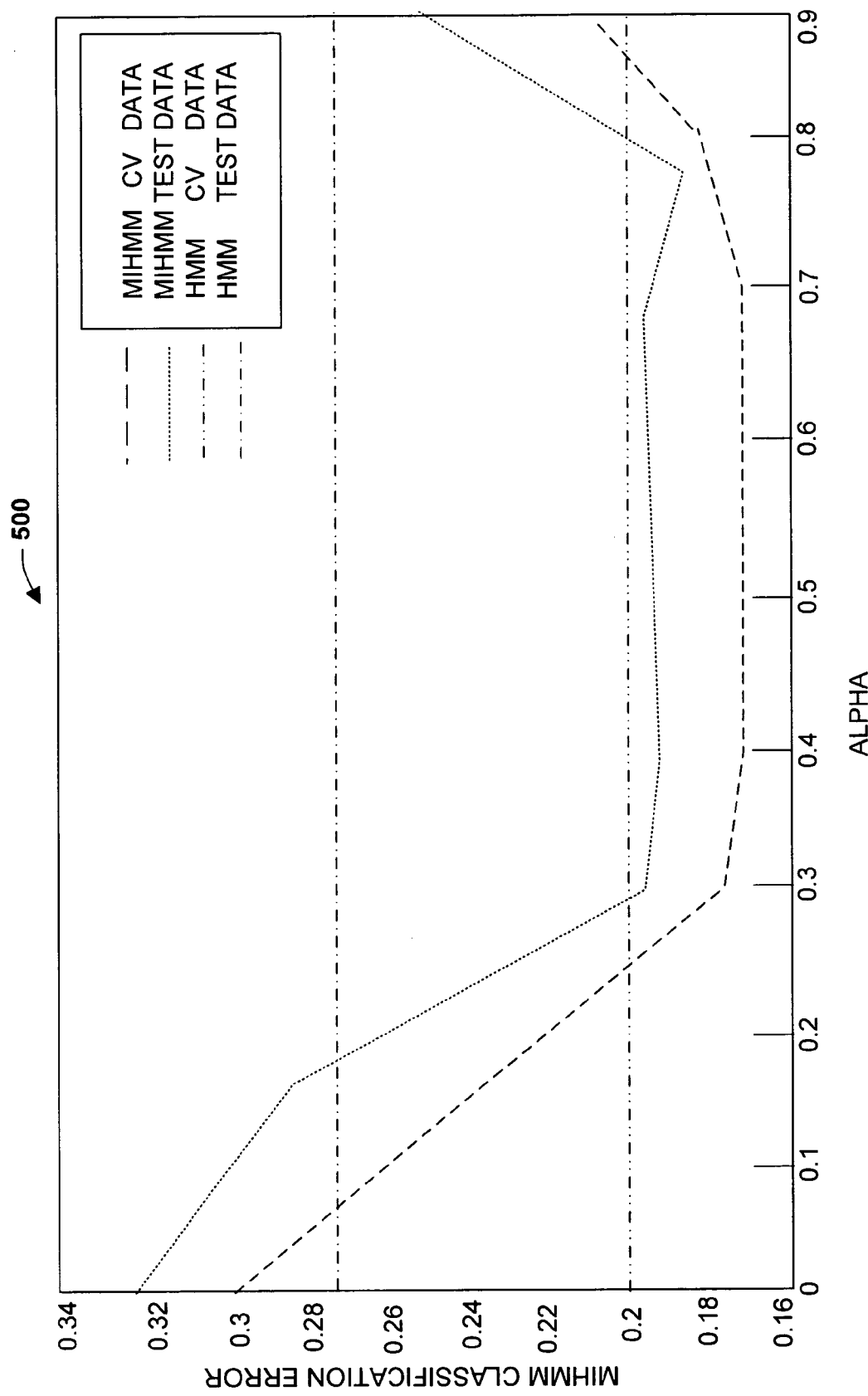
FIGS. 7 and 8 illustrate model performance comparisons in accordance with an aspect of the present invention.
Figure 8:
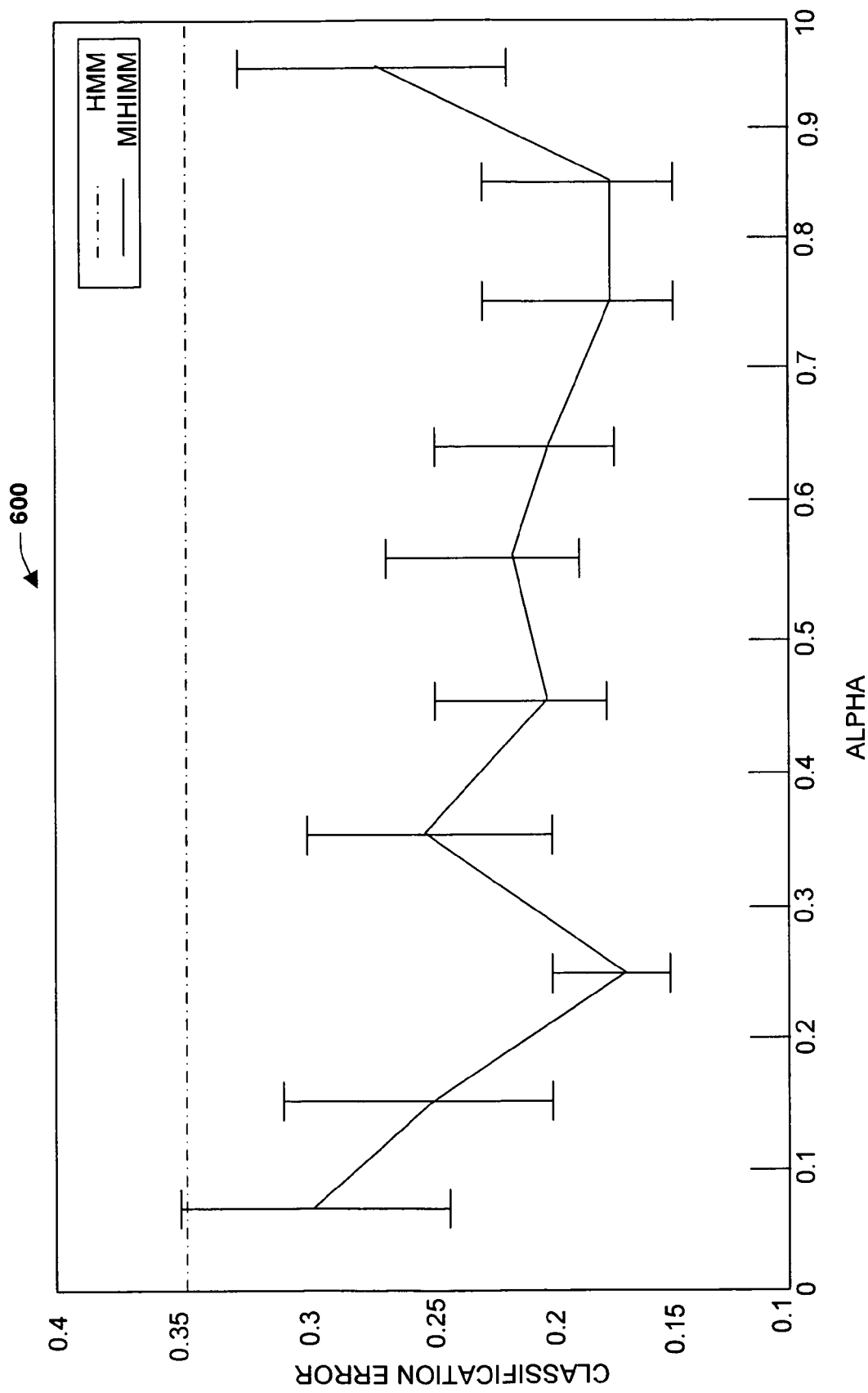
Figure 9:
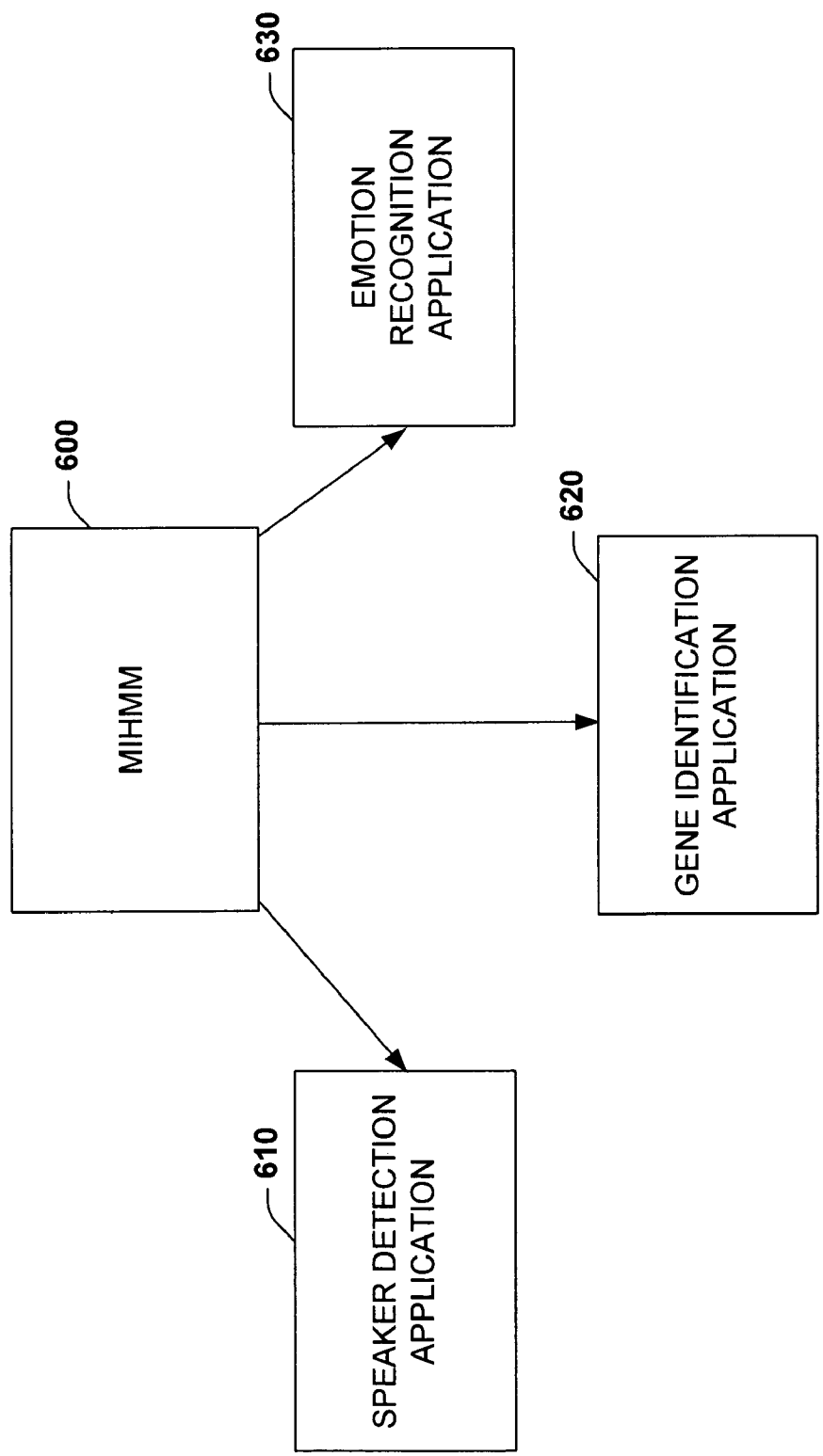
FIG. 9 illustrates example applications in accordance with the present invention.

FIGS. 7-9 illustrate exemplary performance data and possible applications of the present invention in order to highlight one or more aspects. It is to be appreciated however, that the present invention is not limited to the illustrated data and/or applications depicted. The following discussion describes a set of experiments that were carried out to obtain quantitative measures of the performance of MIHMMs when compared to HMMs in various classification tasks. The experiments were conducted with synthetic and real, discrete and continuous, supervised and unsupervised data. In the respective experiments, an optimal value for alpha, $\alpha_{optimal}$, was estimated employing k-fold cross-validation on a validation set. In the experiments, a k was selected as 10 or 12, for example. The given dataset was randomly divided into two groups, one for training $D^{tr}$ and the other for testing $D^{te}$. The size of the test dataset was typically 20-50% of the training dataset. For cross validation—to select the best $\alpha$- the training set $D^{tr}$ was further subdivided into k mutually exclusive subsets (folds) $D_1^{tr}, D_2^{tr}, \ldots, D_k^{tr}$ of the same size (1/k of the training data size). The models were trained k times; wherein at time $t \in \{1, \ldots, k\}$ the model was trained on $D^{tr}\backslash D_t^{tr}$ and tested on $D_t^{tr}$. An alpha, $\alpha_{optimal}$, was then selected that provided optimized performance, and it was subsequently employed on the testing data $D^{te}$.

In a first case, 10 datasets of randomly sampled synthetic discrete data were generated with 3 hidden states, 3 observation values and random additive observation noise, for example. In one example, the experiment employed 120 samples per dataset for training, 120 per dataset for testing and a 10-fold cross validation to estimate $\alpha$. The training was supervised for both HMMs and MIHMMs. MIHMMs had an average improvement over the 10 datasets of about 11%, when compared to HMMs of similar structure. The $\alpha_{optimal}$ determined and selected was 0.5 (a range from about 0.3 to 0.8 was suitable). A mean classification error over the ten datasets for HMMs and MIHMMs with respect to $\alpha$ is depicted in FIG. 7. A summary of the mean accuracies of HMMs and MIHMMs is depicted below in Table 1.

FIG. 9 depicts an MIHMM model 600 employed in various exemplary applications. At 610, a speaker identification application 610 can be employed with the MIHMM 600. An estimate of a person's state is typically important for substantially reliable functioning of interfaces that utilize speech communication. In one aspect, detecting when users are speaking is a central component of open mike speech-based user interfaces, especially given the need to handle multiple people in noisy environments. As illustrated below, some experiments were conducted in a speaker detection task. A speaker detection dataset consisted of five sequences of one user playing blackjack in a simulated casino setup such as from a Smart Kiosk. The sequences were of varying duration from 2000 to 3000 samples, with a total of about 12500 samples. The original feature space had 32 dimensions that resulted from quantizing five binary features (e.g., skin color presence, face texture presence, mouth motion presence, audio silence presence and contextual information). Typically, the 14 most significant dimensions were selected out of the original 32-dimensional space.

The learning task in this case at 610 was supervised for HMMs and MIHMMs. There were at least three variables of interest: the presence/absence of the speaker, the presence/absence of a person facing frontally, and the existence/absence of an audio signal or not. A goal was to identify the correct state out of four possible states: (1) no speaker, no frontal, no audio; (2) no speaker, no frontal and audio; (3) no speaker, frontal and no audio; (4) speaker, frontal and audio. FIG. 8 illustrates the, classification error for HMMs (dotted line) and MIHMMs (solid line) with α varying from about 0.05 to 0.95 in 0.1 increments. In this case, MIHMMs outperformed HMMs for all the values of α. The optimal alpha via cross validation was $\alpha_{optimal}$=0.75 (or thereabout). The accuracies of HMMs and MIHMMs are summarized in Table 1 below.

At 620, a gene identification application is illustrated. Gene identification and gene discovery in new genomic sequences is an important computational question addressed by scientists working in the domain of bioinformatics, for example. At 620, HMMs and MIHMMs were tested in the analysis of part of an annotated sequence (about 7000 data points on training and 2000 on testing) of an Adh region in Drosophila. The task was to annotate a sequence into exons and introns and compare the results with a ground truth. 10-fold cross-validation was employed to estimate an optimal value of α, which was $\alpha_{optimal}$=0.35 (or thereabout). The improvement of MIHMMs over HMMs on the testing sequence was about 19%, as Table 1 reflects.

TABLE 1

| DATASET | HMM | MIHMM |
| --- | --- | --- |
| SYNTDISC | 73% | 81% ($\alpha_{optimal}$ = about 0.50) |
| SPEAKERID | 64% | 88% ($\alpha_{optimal}$ = about 0.75) |
| GENE | 51% | 61% ($\alpha_{optimal}$ = about 0.35) |
| EMOTION | 47% | 58% ($\alpha_{optimal}$ = about 0.49) |

Classification accuracies for HMMs and MIHMMs on different datasets.

At 630 of FIG. 9, an emotion recognition task 630 was applied to known emotion data. The data had been obtained from a video database of five people that had been instructed to display facial expressions corresponding to the following six basic emotions: anger, disgust, fear, happiness, sadness and surprise. The database consisted of six sequences of one or more associated facial expressions for each of the five subjects. In the experiments reported herein, unsupervised training of continuous HMMs and MIHMMs was employed. A 12-fold cross validation was utilized to select an optimal value of α, which led to $\alpha_{optimal}$= about 0.49.The mean accuracies for both types of models are displayed in Table 1.

The above discussion and drawings have illustrated a framework for estimating the parameters of Hidden Markov Models. A novel objective function has been described that is the convex combination of the mutual information, and the likelihood of the hidden states and the observations in an HMM. Parameter estimation equations in the discrete and continuous, supervised and unsupervised cases were also provided. Moreover, it has been demonstrated that a classification task via the MIHMM approach provides better performance when compared to standard HMMs in accordance with different synthetic and real datasets.

Figure 10:
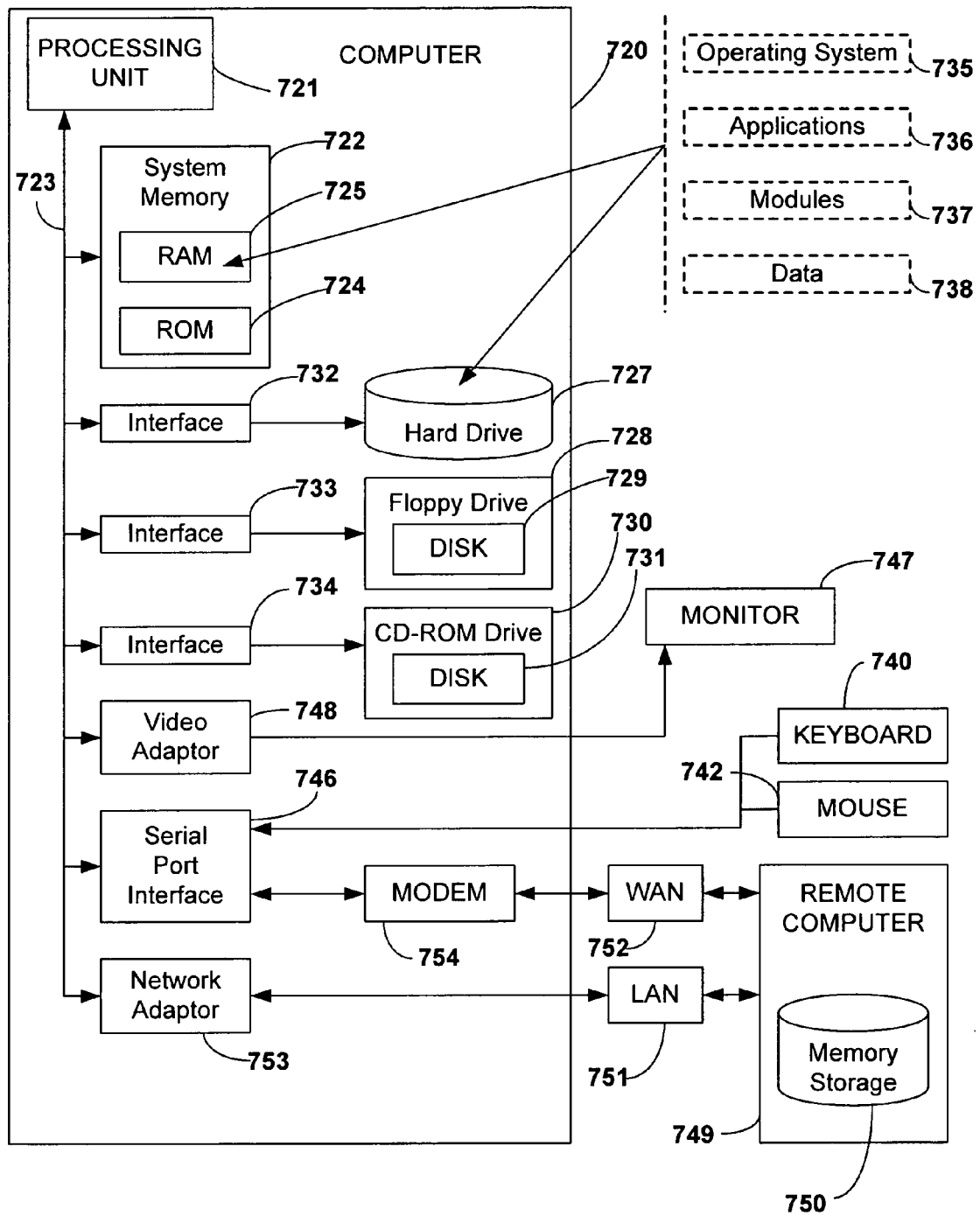
FIG. 10 is a schematic block diagram illustrating a suitable operating environment in accordance with an aspect of the present invention.

In order to provide a context for the various aspects of the invention, FIG. 10 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, handheld computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 10, an exemplary system for implementing the various aspects of the invention includes a computer 720, including a processing unit 721, a system memory 722, and a system bus 723 that couples various system components including the system memory to the processing unit 721. The processing unit 721 may be any of various commercially available processors. It is to be appreciated that dual microprocessors and other multi-processor architectures also may be employed as the processing unit 721.

The system bus may be any of several types of bus structure including a memory bus or memory controller, a peripheral bus, and a local bus using any of a variety of commercially available bus architectures. The system memory may include read only memory (ROM) 724 and random access memory (RAM) 725. A basic input/output system (BIOS), containing the basic routines that help to transfer information between elements within the computer 720, such as during start-up, is stored in ROM 724.

The computer 720 further includes a hard disk drive 727, a magnetic disk drive 728, e.g., to read from or write to a removable disk 729, and an optical disk drive 730, e.g., for reading from or writing to a CD-ROM disk 731 or to read from or write to other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions, etc. for the computer 720. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 725, including an operating system 735, one or more application programs 736, other program modules 737, and program data 738. It is noted that the operating system 735 in the illustrated computer may be substantially any suitable operating system.

A user may enter commands and information into the computer 720 through a keyboard 740 and a pointing device, such as a mouse 742. Other input devices (not shown) may include a microphone, a joystick, a game pad, a satellite dish, a scanner, or the like. These and other input devices are often connected to the processing unit 721 through a serial port interface 746 that is coupled to the system bus, but may be connected by other interfaces, such as a parallel port, a game port or a universal serial bus (USB). A monitor 747 or other type of display device is also connected to the system bus 723 via an interface, such as a video adapter 748. In addition to the monitor, computers typically include other peripheral output devices (not shown), such as speakers and printers.

The computer 720 may operate in a networked environment using logical connections to one or more remote computers, such as a remote computer 749. The remote computer 749 may be a workstation, a server computer, a router, a peer device or other common network node, and typically includes many or all of the elements described relative to the computer 720, although only a memory storage device 750 is illustrated in FIG. 10. The logical connections depicted in FIG. 10 may include a local area network (LAN) 751 and a wide area network (WAN) 752. Such networking environments are commonplace in offices, enterprise-wide computer networks, Intranets and the Internet.

When employed in a LAN networking environment, the computer 720 may be connected to the local network 751 through a network interface or adapter 753. When utilized in a WAN networking environment, the computer 720 generally may include a modem 754, and/or is connected to a communications server on the LAN, and/or has other means for establishing communications over the wide area network 752, such as the Internet. The modem 754, which may be internal or external, may be connected to the system bus 723 via the serial port interface 746. In a networked environment, program modules depicted relative to the computer 720, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 720, unless otherwise indicated. Such acts and operations are sometimes referred to as being computer-executed. It will be appreciated that the acts and symbolically represented operations include the manipulation by the processing unit 721 of electrical signals representing data bits which causes a resulting transformation or reduction of the electrical signal representation, and the maintenance of data bits at memory locations in the memory system (including the system memory 722, hard drive 727, floppy disks 729, and CD-ROM 731) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A computer readable medium encoded with a computer program for predicting audio states, video or image states or gene sequence states in a recognition system, comprising the following computer executable component(s):

a component to determine one or more states based in part upon previous training data and sampled data, the component employing a classification model that maximizes a joint likelihood and a mutual information between at least one hidden state and observed data in order to mitigate classification error associated with the model.

2. The system of claim 1, the training data includes at least one of audio data, video data, image data, stream data, sequence data and pattern data.

3. The system of claim 1, further comprising a learning component that is trained in accordance with the training data.

4. The system of claim 1, the sampled data is at least one of signal data, pattern data audio data, video data, stream data, and a data sequence read from a file.

5. The system of claim 1, further comprising at least one application to employ the determined states to achieve one or more possible automated outcomes.

6. The system of claim 5, the determined states include N speaker states, N being an integer, the speaker states are employed to determine a speaker's presence in a noisy environment.

7. The system of claim 5, the determined states include M visual states, M being an integer, the visual states are employed to detect features of a person's facial expression given previously learned expressions.

8. The system of claim 5, the determined states include sequence states that predict unknown gene sequences that are derived from previous training sequences.

9. The system of claim 1, the classification employs at least one of a Hidden Markov Model (HMM), a Bayesian network model, a decision-tree model and other graphical model.

10. The system of claim 1, the classification model employs an objective function expressed as:

$$F=(1-\alpha)I(Q,X)+\alpha \log P(X_{obs},Q_{obs})$$

wherein $\alpha \in [0,1]$, provides a manner of determining a suitable weighting between a Maximum Likelihood criterion (ML) (when $\alpha=1$) and a Maximum Mutual Information (MMI) ($\alpha=0$) criterion, and $I(Q,X)$ refers to the mutual information between the states (Q) and the observations (X).

11. The system of claim 3, the learning component can be a discrete, a continuous, a supervised and an unsupervised learning algorithm.

12. The system of claim 5, the determined states include at least one of: a (no speaker, no frontal, no audio) state; a (no speaker, no frontal and audio) state; a (no speaker, frontal and no audio) state; and a (speaker, frontal and audio) state.

13. The system of claim 5, the determined states include at least one of anger, disgust, fear, happiness, sadness, and surprise.

14. A computer readable medium encoded with a computer program for a recognition method to predict audio states, video or image states or gene sequence states, the method comprising, comprising the following computer executable instruction(s):

employing a model to determine at least one state, the model trades-off a maximum likelihood criterion and a maximum mutual information criterion to mitigate classification errors associated with the model.

15. The method of claim 14, further comprising defining an objective function expressed as:

$$F=(1-\alpha)I(Q,X)+\alpha \log P(X_{obs},Q_{obs})$$

wherein $\alpha \in [0,1]$, provides a manner of determining an appropriate weighting between the maximum likelihood criterion (when $\alpha=1$) and the maximum mutual information criterion (when $\alpha=0$), and I (Q,X) refers to the mutual information between the states (Q) and the observations (X).

16. The method of claim 15, further comprising reducing the objective function to:

$$F=(1-\alpha)I(Q,X)+\alpha \log P(X_{obs})$$

if the state sequence is not observed.

17. The method of claim 15, determining an optimal value for $\alpha$ via a k-fold cross-validation on a validation data set.

18. The method of claim 14, further comprising determining at least one of a discrete, a continuous, a supervised and an unsupervised learning algorithm.

19. The method of claim 14, the at least one state includes at least one of a speaker state, a visual state, and a sequence state.

20. A computer readable medium encoded with a data structure to communicate prediction data between at least two processes executing on one or more computer systems, the data structure comprising:

a first data field containing data identifying one or more hidden states determined by a classification model; and a second data field containing a parameter that optimizes a trade-off between a maximum likelihood criterion and a maximum mutual information criterion to mitigate classification errors associated with a classification model.

* * * * *